May 29, 1962 V. BECHSTEIN 3,037,111
WARNING SYSTEM FOR RAILROAD LEVEL CROSSINGS
Filed June 10, 1957 2 Sheets-Sheet 1
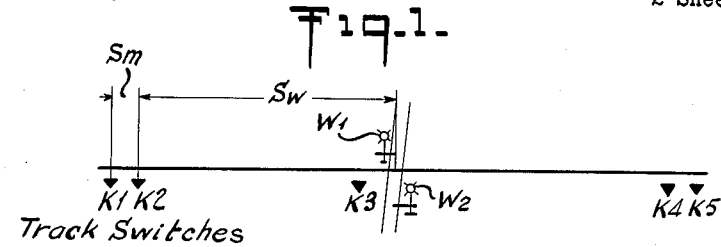
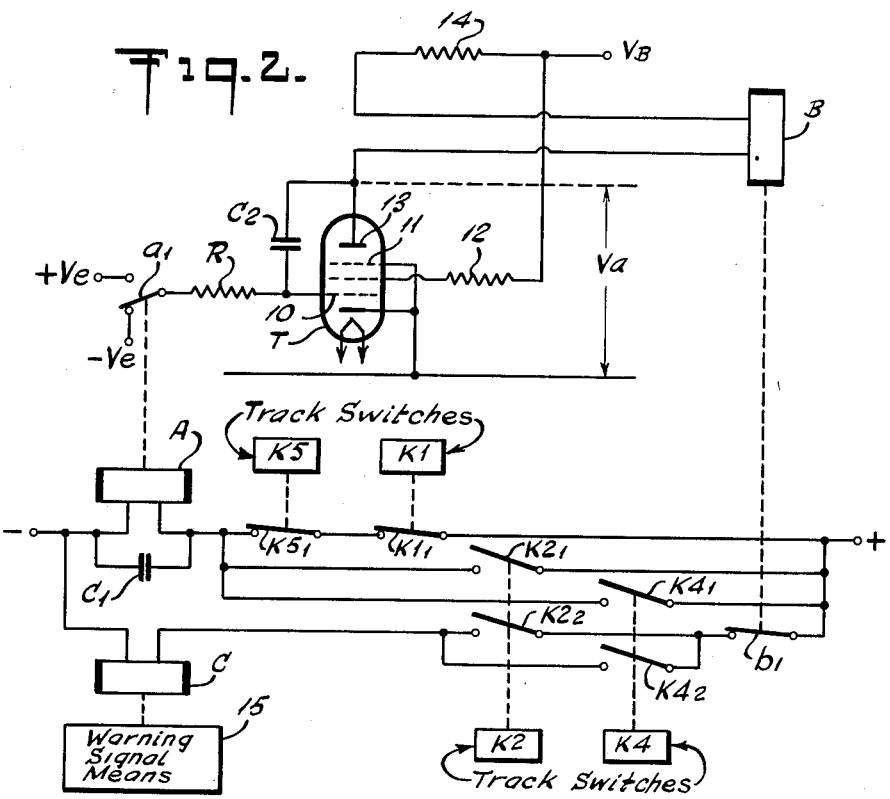
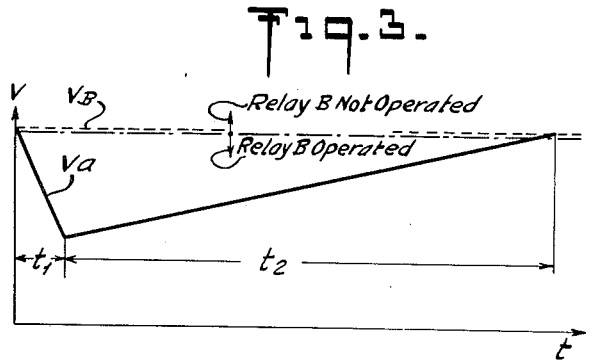
INVENTOR
VOLKER BECHSTEIN
BY
ATTORNEYS May 29, 1962 V. BECHSTEIN 3,037,111
WARNING SYSTEM FOR RAILROAD LEVEL CROSSINGS
Filed June 10, 1957 2 Sheets-Sheet 2
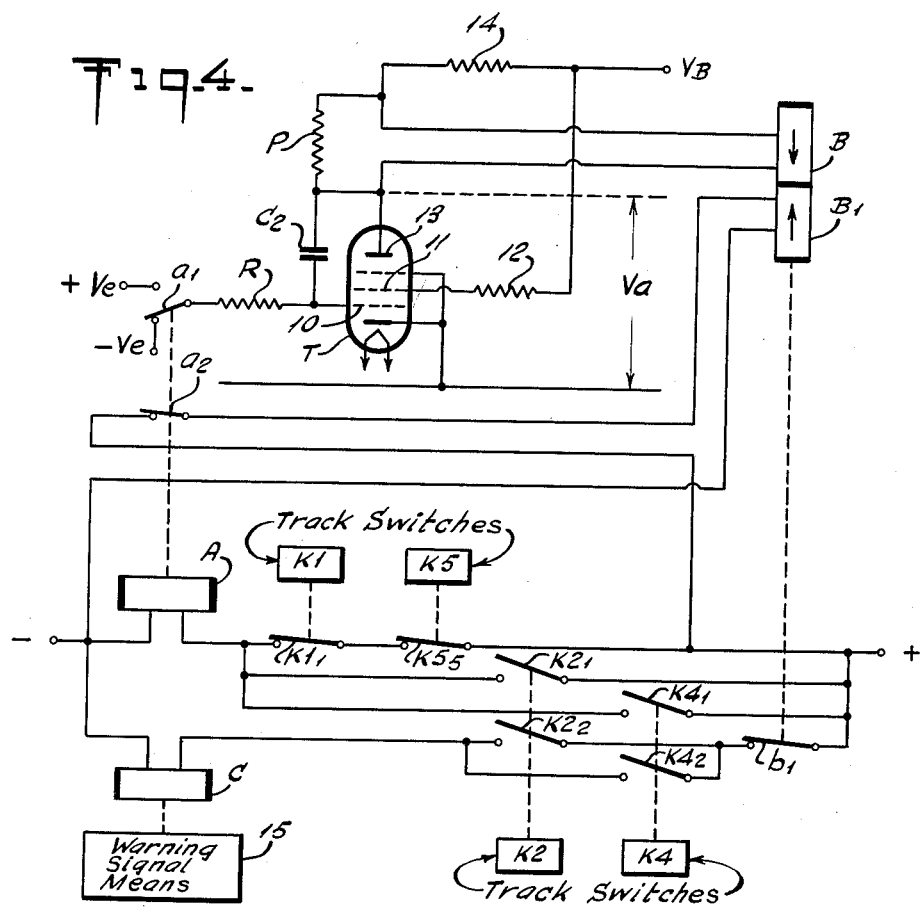
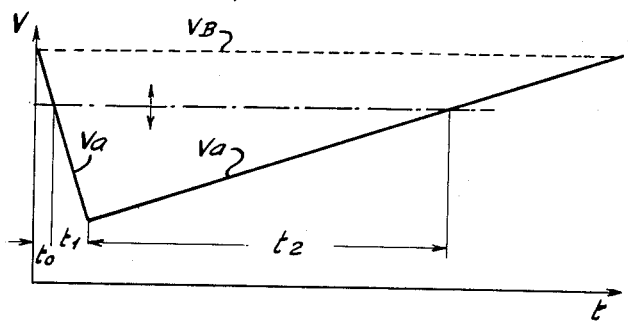
INVENTOR
VOLKER BECHSTEIN
BY
ATTORNEYS `United States Patent Office`

3,037,111
Patented May 29, 1962

3,037,111
WARNING SYSTEM FOR RAILROAD
LEVEL CROSSINGS
Volker Bechstein, Berlin-Treptow, Germany, assignor to
VEB Werk für Signal- und Sicherungstechnik Berlin,
Berlin-Treptow, Germany
Filed June 10, 1957, Ser. No. 664,533
Claims priority, application Germany Dec. 6, 1956
7 Claims. (Cl. 246—130)

The present invention relates to automatic level crossing safety installations and particularly to circuit arrangements for adjusting the warning time of signals at such crossings.

The invention is applicable to installations in which a train passes through a measuring section $S_m$ and then through a warning section $S_w$ provided along the tracks and the train speed through both sections remains constant and in which the warning signal is operated after a given time delay. The ratio of the delay time spent by the train in the warning section to the measuring time, is the same as the ratio of the length of the warning section to the measuring section. For operating the various mechanisms of the system, use is made of customary means used in such installation such as cams, drive motors and step by step switches.

Various types of systems are already known in which the measuring time is of the same ratio to the delay time as the length of the measurement section is to the length of the warning section. Such systems generally use devices responsive to train control mechanisms and have an operating time which is dependent on the speed of the train in the measurement section. Upon actuating one of the rail switches, which is at the beginning of the measuring section, the zero or initial operative position of the mechanism is set with a given time delay. The warning is then given when the delay has expired. The time, therefore, which passes from the beginning of the warning until the appearance of the train at the crossing must accordingly always be the same, regardless of the speed characteristic of each train. In another type of system, a step by step switch effects a number of steps corresponding to the speed of the train in the measuring section. While the train passes onto the warning section, another step by step switch moves at a lower speed which corresponds to the aforementioned delay until both switches are in the same position. When the number of steps of the two step by step switches is the same, the warning apparatus is connected.

The prior systems have the disadvantages of requiring a rather large amount of apparatus and therefore require a relatively large amount of electrical power and maintenance, particularly due to the use therein of parts which have mechanical movements and therefore are subject to breakdown. Furthermore, the structural size of the previous systems necessitates an amount of space which it is difficult to make available in switch cabinets on the tracks. Other known systems have the disadvantages of requiring a large number of relays.

An object of this present invention is to provide a switching arrangement for adjusting the warning time, which avoids the above mentioned defects of previously known systems. This result is obtained by producing a linear voltage drop by means of a relaxation or sweep circuit, for instance, a "Miller Integrating Circuit," which after a given lead time is released by a rail switch. After a measuring time which is determined by the actuation of another rail switch, the voltage drop is changed to a voltage rise which continues for a period until a predetermined voltage value is obtained for initiating the warning function.

The system will be fully understood and other objects and advantages of the invention will become apparent from the following description and the drawing in which:

FIG. 1 is a diagram of a level crossing warning installation lay-out;

FIG. 2 is a diagram of a circuit according to the invention;

FIG. 3 is a voltage diagram of the operation of the circuit of FIG. 2;

FIG. 4 is a circuit diagram of another embodiment of the invention; and

FIG. 5 is a voltage diagram illustrating the operation of the circuit of FIG. 4.

Referring to FIG. 1, there is shown a level crossing at which there are warning signals $W_1$ and $W_2$. On both sides of the crossing, there are measuring sections $S_m$ defined by train operated switches K1 and K2 and a warning section $S_w$ defined by switches K2 and K3. On the other side of the crossing, a similar measuring section is defined by switches K4 and K5 and a warning section is defined by switches K3 and K4. The length of the warning sections may be about ten times the length of the measuring section.

If switch K1 is actuated by a train which enters the measuring section at any given speed, contact $K1_1$ is opened and disconnects the relay A (FIG. 2) which is normally energized. Relay A is then restored after a delay or lead time $t_0$ which corresponds to the time of travel the fastest train through the measuring section $S_m$. This delay is caused by the capacitor $C_1$ in parallel with the coil of relay A. The restoring of relay A causes its contact $a_1$ to shift from a negative grid bias voltage $V_e$ to a positive grid bias voltage $+V_e$ applied through a high resistance R to the control grid 10 of an electron tube T. Tube T is connected in a "Miller Integrating Circuit," which is well known in the art. The circuit is described by B. H. Briggs: The Miller Integrator (II). Electronic Engineering, vol. 20, September 1948, p. 279, and in "Waveforms" by Massachusetts Institute of Technology 1949, published by McGraw-Hill Book Company, pp. 664–665. The anode 13 of the tube is connected through a condenser $C_2$ to the control grid 10 and screen grid 11 is connected to the battery voltage $V_B$ through the resistor 12. The anode 13 is connected to voltage $V_B$ through the coil of a relay B and a resistor 14. When the bias on grid 10 is negative, the plate voltage $V_a$ is substantially equal to the battery voltage $V_B$. When contact $a_1$ is shifted to place a positive bias voltage on control grid 10, voltage $V_a$ drops linearly during the measuring time $t_1$ as indicated in FIG. 3. Upon the commencement of the voltage drop, relay B is operated to be closed.

The measuring section lies between switches K1 and K2 and the lead time $t_0$ is the time required by the fastest train for traversing measuring section $S_m$. Any slower train needs for passing through $S_m$ the lead time $t_0$ plus a measuring time $t_1$. The lead time $t_0$ is established by the constant delay time of relay A and its circuit, including capacitor $C_1$, as described above.

After the lead time $t_0$ and the measuring time $t_1$, which is dependent upon the speed of the train, the train moves over switch K2, which closes contacts $K2_1$ and causes relay A to be actuated. This causes relay contact $a_1$ to be returned to the negative bias voltage $-V_e$. The shifting of the bias voltage to the negative value causes the plate voltage $V_a$ to begin to rise again linearly. The time $t_2$ during which this voltage rise takes place is made, for instance, ten times as large as the time $t_1$ by the selection of suitable values either of the control grid voltages $V_e$, resistors R or capacitances $C_2$. In this connection it should be borne in mind that reversing of the polarity of grid voltages causes the changing of the voltage drop into a voltage increase, while the value of the grid voltage or the resistors R, or capacitors $C_2$, which may be shifted by additional contacts (not shown) of relay A, determines the time ratio of $t_1$ to $t_2$. After the expiration of the time $t_2$ determined in this manner, the voltage $V_a$ rises again to the value of voltage $V_B$ and thereupon, relay B drops out.

In FIG. 2, the relay C is adapted to actuate the warning signals when it is energized. It will be noticed that relay C is restored when contact $K2_2$ is in the open position as shown in FIG. 2. Upon actuation of contact $K2_2$ by the train, the circuit of relay C is prepared for energization, but relay C is not operated because at the beginning of time $t_1$ relay B is operated causing the normally closed contact $b_1$ to interrupt the circuit of relay C. Relay C, therefore, is not energized during the time $t_1$ or $t_2$, but at the end of the time $t_2$, relay B drops out and relay C is energized through the closed contacts $b_1$ and $K2_2$. It will be understood that various known means may be used for holding contacts K2 closed, such as a relay which is energized when the rail contact of K2 is closed and which is delayed by capacitive means or a self holding circuit. Contacts K1, K3, K4, and K5 operate similarly to contacts K2. It will be evident that various means which are well known and common in the art may be used for holding the contacts of switches K1, K2, K4 and K5 in their operated positions until the train reaches the crossing and then restoring these switches to their initial positions. These rail switches are shown at C1 and C2 of Williamson Patent No. 2,028,370. Relay K3 may be similar to relays TR and 42 of Williamson Patent No. 2,028,370. Since contact $b_1$ is closed when relay B is unenergized, relay C will be energized and actuated immediately upon the operation of contacts $K2_2$ and release the warning signal means 15 in case any fault occurs, such as, for instance, the absence of plate voltage or the failure of tube T.

FIG. 4 shows a modification of the circuit shown in FIG. 2. The relay A is not shunted by a capacitor and therefore, operates and restores immediately without time delay when contacts $K1_1$ or $K5_1$ are operated. Relay contact $a_1$, therefore, immediately shifts the control grid bias from $-V_e$ to $+V_e$, causing the voltage $V_a$ to begin to drop immediately as indicated in FIG. 5. The relay B however, is actuated only after a time delay $t_0$ by virtue of the fact that its first winding is shunted by a resistor P. Relay B is provided with a second opposed winding $B_1$ which is normally energized through a contact $a_2$ of relay A so that relay B opens or restores again at the same voltage at which it was previously closed or actuated. As shown in FIG. 5, the voltage $V_a$ continues to increase after the time $t_2$, that is, after the relay B has dropped out, but this increase in the current has no influence on the operation of relay C and serves only to restore the initial condition of the circuit. The remainder of the circuit of FIG. 4 operates in the same manner as that of FIG. 2.

In the above description of the circuit, it has been assumed that the control grid voltage is initially negative, but it will be understood that it can just as well be positive and then during the measuring time $t_1$ an increase in voltage will occur, instead of a decrease in voltage, and during the delay time $t_2$ a decrease in voltage instead of an increase in voltage will occur.

What I claim is:
1. A circuit arrangement for an automatic railroad level crossing safety installation having measuring and warning sections through which trains travel at constant speeds, comprising switches positioned so as to be operated by a train and spaced along the tracks for delimiting a relatively short measuring section followed by a relatively long warning section, first linear sweep voltage generating means responsive to the operation of a first of said switches located at the beginning of the measuring section for producing a substantially linearly changing voltage during a period $t_1$ occurring after a predetermined time delay $t_0$, a second switch at the end of the measuring section, second means responsive to said second switch for reversing the sense of said voltage change while maintaining it linear, warning signal releasing means, means responsive to a predetermined value of said voltage for actuating said warning signal releasing means, whereby the warning signal commences after said reversed change of voltage has proceeded for a time $t_2$ which is a function of the time $t_1$ and hence of the time required for the train to pass through the measuring section.

2. A circuit arrangement according to claim 1, wherein said first means causes said substantially linear voltage change to occur also during the delay time $t_0$.

3. A circuit arrangement according to claim 1, wherein said first means is arranged to cause a voltage drop during the time $t_1$ and a voltage increase during the time $t_2$.

4. A circuit arrangement according to claim 1, wherein said first means is arranged to cause a voltage increase during the time $t_1$ and a voltage decrease during the time $t_2$.

5. A circuit arrangement according to claim 1, wherein said sweep voltage generating means includes a relaxation circuit comprising an electron discharge device having a control electrode and means responsive to the first and second switches for changing the bias voltage on said control electrode.

6. A circuit arrangement according to claim 5, wherein said relaxation circuit is a Miller integrating circuit having means for adjusting the time constant thereof in response to the first and second switches to adjust the ratio of the time $t_1$ to the time $t_2$.

7. A circuit arrangement according to claim 6, wherein the means for producing the warning signal includes a relay which when unenergized has normally closed contacts in series with the warning signal releasing means.

References Cited in the file of this patent

UNITED STATES PATENTS

| | | |
|---|---|---|
| 1,934,094 | Saunders | Nov. 7, 1933 |
| 2,028,370 | Williamson | Jan. 21, 1936 |
| 2,113,642 | Dodd | Apr. 12, 1938 |
| 2,743,358 | Handel | Apr. 24, 1956 |

OTHER REFERENCES

"Waveforms" by Massachusetts Institute of Technology, 1949, published by McGraw-Hill Book Company. Pages 664, 665. (Copy in Div. 51.)